United States Patent
Hutchinson et al.

(10) Patent No.: US 10,322,651 B2
(45) Date of Patent: Jun. 18, 2019

(54) CHILD SAFETY SEAT

(71) Applicant: Wonderland Switzerland AG, Steinhausen (CH)

(72) Inventors: James M. F. Hutchinson, Mohnton, PA (US); R. Scott Anderson, Narvon, PA (US); Clyde S. Harmes, V, Mohnton, PA (US)

(73) Assignee: Wonderland Switzerland AG, Steinhausen (CH)

( * ) Notice: Subject to any disclaimer, the term of this patent is extended or adjusted under 35 U.S.C. 154(b) by 109 days.

(21) Appl. No.: 15/613,141

(22) Filed: Jun. 3, 2017

(65) Prior Publication Data

US 2017/0355284 A1  Dec. 14, 2017

Related U.S. Application Data

(60) Provisional application No. 62/349,927, filed on Jun. 14, 2016.

(51) Int. Cl.
*B60N 2/28*  (2006.01)

(52) U.S. Cl.
CPC ......... *B60N 2/2806* (2013.01); *B60N 2/2812* (2013.01); *B60N 2/2821* (2013.01); *B60N 2/2857* (2013.01); *B60N 2/2869* (2013.01); *B60N 2/2872* (2013.01); *B60N 2/2875* (2013.01); *B60N 2/2803* (2013.01); *B60N 2002/2818* (2013.01)

(58) Field of Classification Search
CPC .. B60N 2/2806; B60N 2/2812; B60N 2/2821; B60N 2/2857; B60N 2/2869; B60N 2/2872; B60N 2/2875; B60N 2/2803

USPC .................................................... 297/256.12
See application file for complete search history.

(56) References Cited

U.S. PATENT DOCUMENTS

| | | | |
|---|---|---|---|
| 6,158,807 A | 12/2000 | Hampton | |
| 6,196,629 B1* | 3/2001 | Onishi | B60N 2/2806 |
| | | | 297/256.12 |
| 6,659,564 B2* | 12/2003 | Kassai | B60N 2/146 |
| | | | 297/250.1 |
| 7,086,695 B2 | 8/2006 | Hosoya | |
| 8,613,480 B1* | 12/2013 | Campbell | B60N 2/2806 |
| | | | 297/253 |
| 2008/0246316 A1* | 10/2008 | Carine | B60N 2/2806 |
| | | | 297/216.11 |

(Continued)

FOREIGN PATENT DOCUMENTS

| | | |
|---|---|---|
| AU | 2011200416 A1 | 8/2011 |
| CN | 1382602 A | 12/2002 |

(Continued)

*Primary Examiner* — Mark R Wendell
(74) *Attorney, Agent, or Firm* — Winston Hsu

(57) ABSTRACT

A child safety seat is for use on a vehicle seat. The vehicle seat has a safety belt. The child safety seat includes a seat base, a seat panel, and a seat body. The seat base has a seat assembly portion and a backrest portion. The seat panel is openably pivoted to the seat assembly portion for rotating between an open position and a closed position. The seat body is disposed on the seat panel. When the seat panel rotates to the open position, the safety belt passes over the seat base for attaching the seat base to the vehicle seat. When the seat panel rotates to the closed position, the seat panel clamps the safety belt cooperatively with the seat base.

15 Claims, 8 Drawing Sheets

(56) References Cited

U.S. PATENT DOCUMENTS

| | | | | |
|---|---|---|---|---|
| 2013/0119732 A1* | 5/2013 | Wuerstl | ............... | B60N 2/2806 |
| | | | | 297/253 |
| 2014/0252815 A1* | 9/2014 | Xu | ....................... | B60N 2/2851 |
| | | | | 297/183.1 |
| 2016/0046213 A1* | 2/2016 | Kirstein | ............... | B60N 2/2875 |
| | | | | 297/256.13 |
| 2016/0207497 A1* | 7/2016 | Seal | ..................... | B60R 22/105 |

FOREIGN PATENT DOCUMENTS

| | | |
|---|---|---|
| CN | 102143860 A | 8/2011 |
| CN | 105492246 A | 4/2016 |
| EP | 1 077 152 A2 | 2/2001 |
| EP | 1 247 688 A1 | 10/2002 |
| EP | 1 077 152 A3 | 5/2003 |
| EP | 1 894 771 B1 | 11/2009 |
| FR | 2 930 485 B1 | 4/2010 |
| JP | H05-1579 U | 1/1993 |
| JP | 2001-114003 A | 4/2001 |
| JP | 2002-301964 A | 10/2002 |
| JP | 2005-22448 A | 1/2005 |
| JP | 4601849 B2 | 12/2010 |

\* cited by examiner

CHILD SAFETY SEAT

CROSS REFERENCE TO RELATED APPLICATIONS

This application claims the benefit of U.S. Provisional Application No. 62/349,927, which was filed on Jun. 14, 2016, and is incorporated herein by reference.

BACKGROUND OF THE INVENTION

1. Field of the Invention

The present invention relates to a child safety seat, and more specifically, to a child safety seat having a seat panel openably coupled to a seat base for clamping a safety belt cooperatively with the seat base.

2. Description of the Prior Art

In general, a child safety seat is used in a motor vehicle to properly restrain a child in the event of an accident. While use of the child safety seat is common, the proper tight installation of the child safety seat is not always achieved. Due to the nature of a rearward facing position of the child safety seat, parents can find it difficult to lift a child over the side of the child safety seat to get him into the child safety seat. This process is only made more difficult by the presence of the vehicle door jamb and roof of the motor vehicle, encouraging parents to turn a child to a forward facing position sooner than may be recommended. Additionally, the difficulty of getting a child into and out of the child safety seat can cause a caregiver to discontinue using the child safety seat prematurely. Yet another difficult process for some caregivers is proper and tight installation of the child safety seat into the motor vehicle.

SUMMARY OF THE INVENTION

The present invention provides a child safety seat for use on a vehicle seat. The vehicle seat has a safety belt. The child safety seat includes a seat base, a seat panel, and a seat body. The seat base has a seat assembly portion and a backrest portion. The seat panel is openably pivoted to the seat assembly portion for rotating between an open position and a closed position. The seat body is disposed on the seat panel. When the seat panel rotates to the open position, the safety belt passes over the seat base for attaching the seat base to the vehicle seat. When the seat panel rotates to the closed position, the seat panel clamps the safety belt cooperatively with the seat base.

The present invention further provides a child safety seat for use on a vehicle seat. The vehicle seat has a safety belt. The child safety seat includes a seat base, a seat panel, and a seat body. The seat base has a seat assembly portion and a backrest portion. The seat panel is openably movable to the seat assembly portion for movement between an open position and a closed position. The seat body is disposed on the seat panel. When the seat panel moves to the open position, a belt path for the safety belt is accessible. When the seat panel moves to the closed position, the belt path for the safety belt is hidden.

The present invention further provides a child safety seat for use on a vehicle seat. The vehicle seat has a safety belt. The child safety seat includes a seat base, a seat panel, and a seat body. The seat base has a seat assembly portion and a backrest portion. The seat panel is detachably coupled to the seat assembly portion. The seat body is disposed on the seat panel to make the seat panel detachable together with the seat body from the seat base. The seat body is installed on the vehicle seat together with the seat panel via the safety belt when the seat panel is detached from the seat base.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
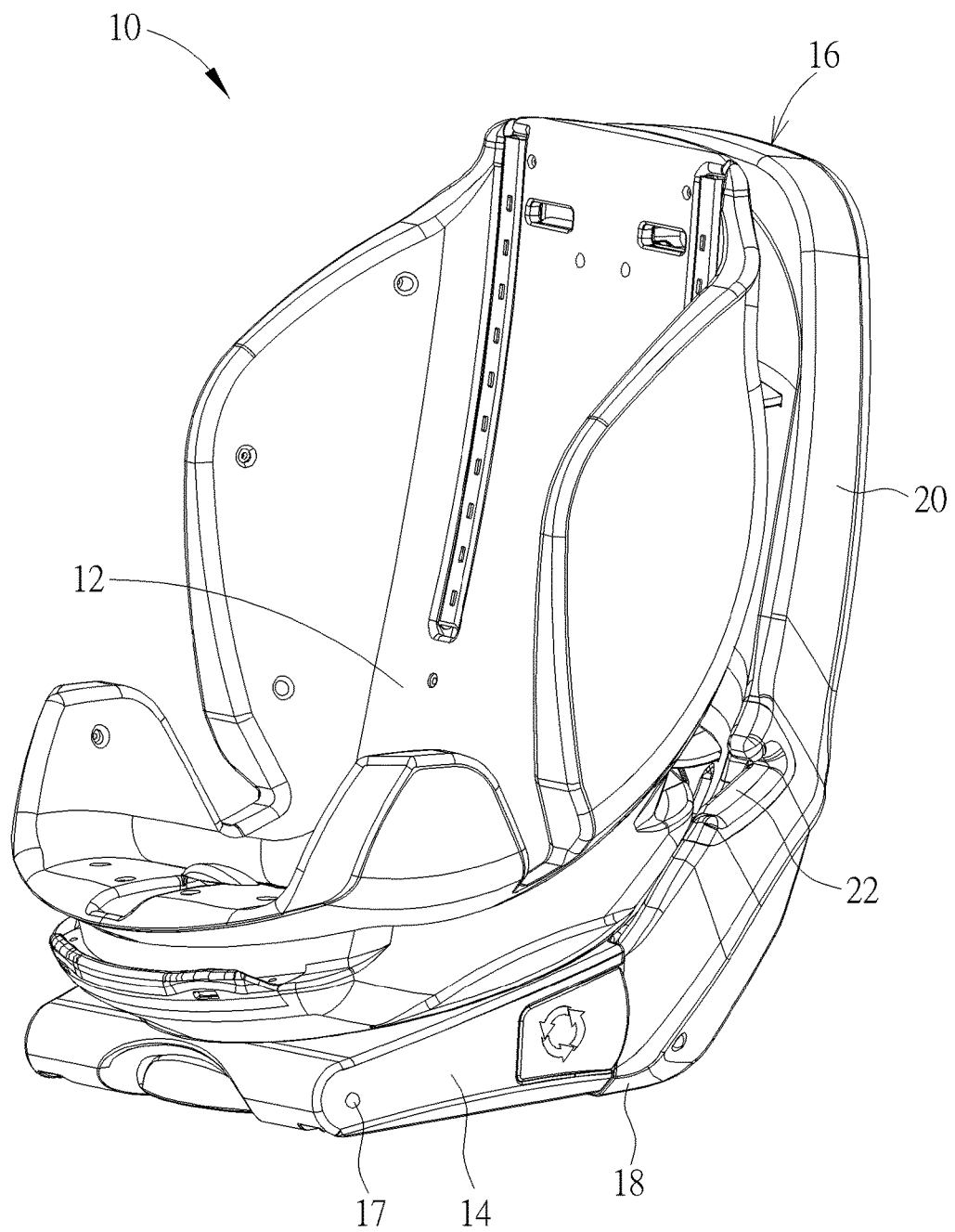
FIG. 1 is a schematic diagram of a child safety seat when a seat body rotates to a forward facing position according to an embodiment of the present invention.
Figure 2:
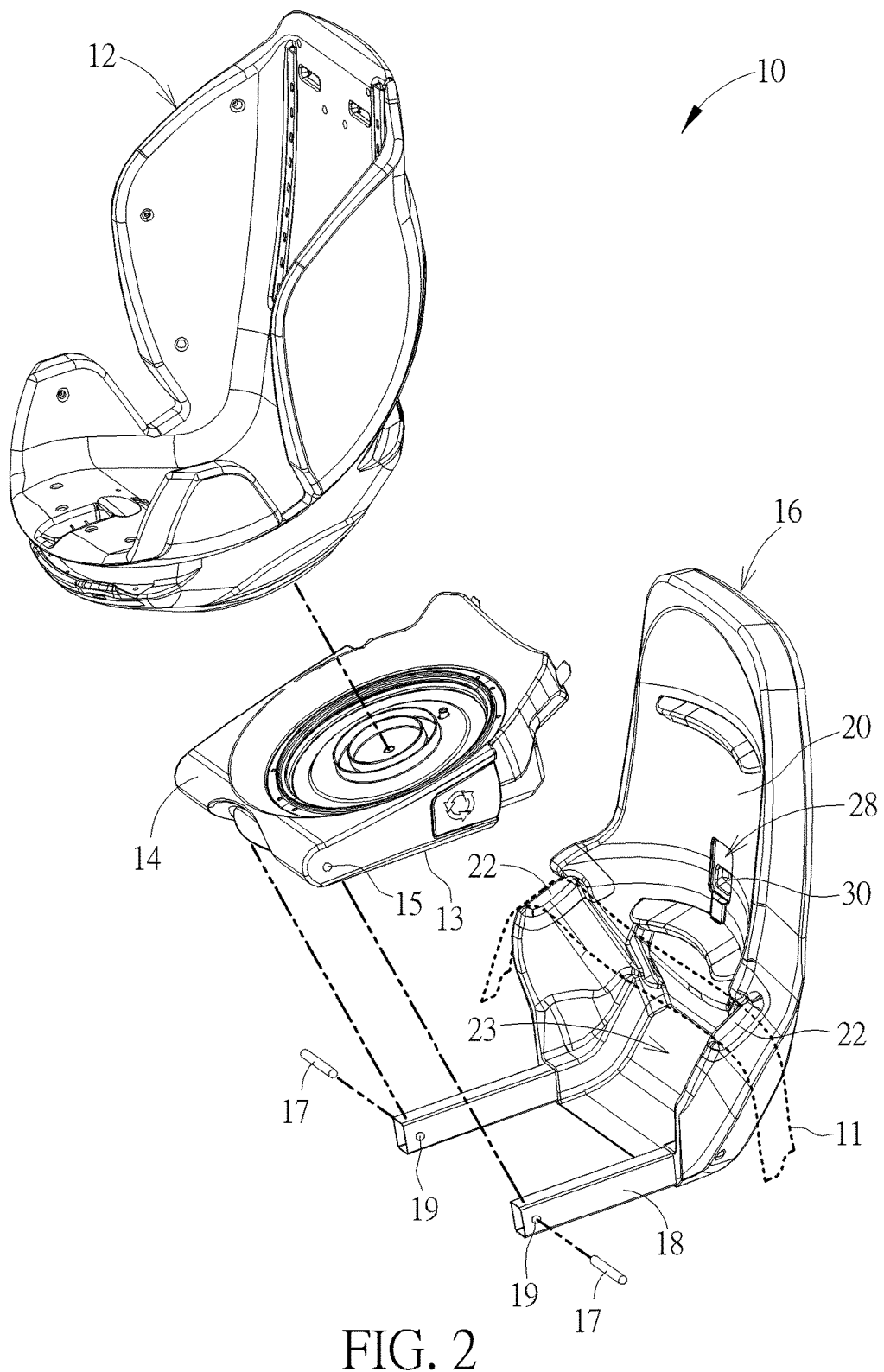
FIG. 2 is an exploded diagram of the child safety seat in FIG. 1 with a safety belt attached thereon.
Figure 3:
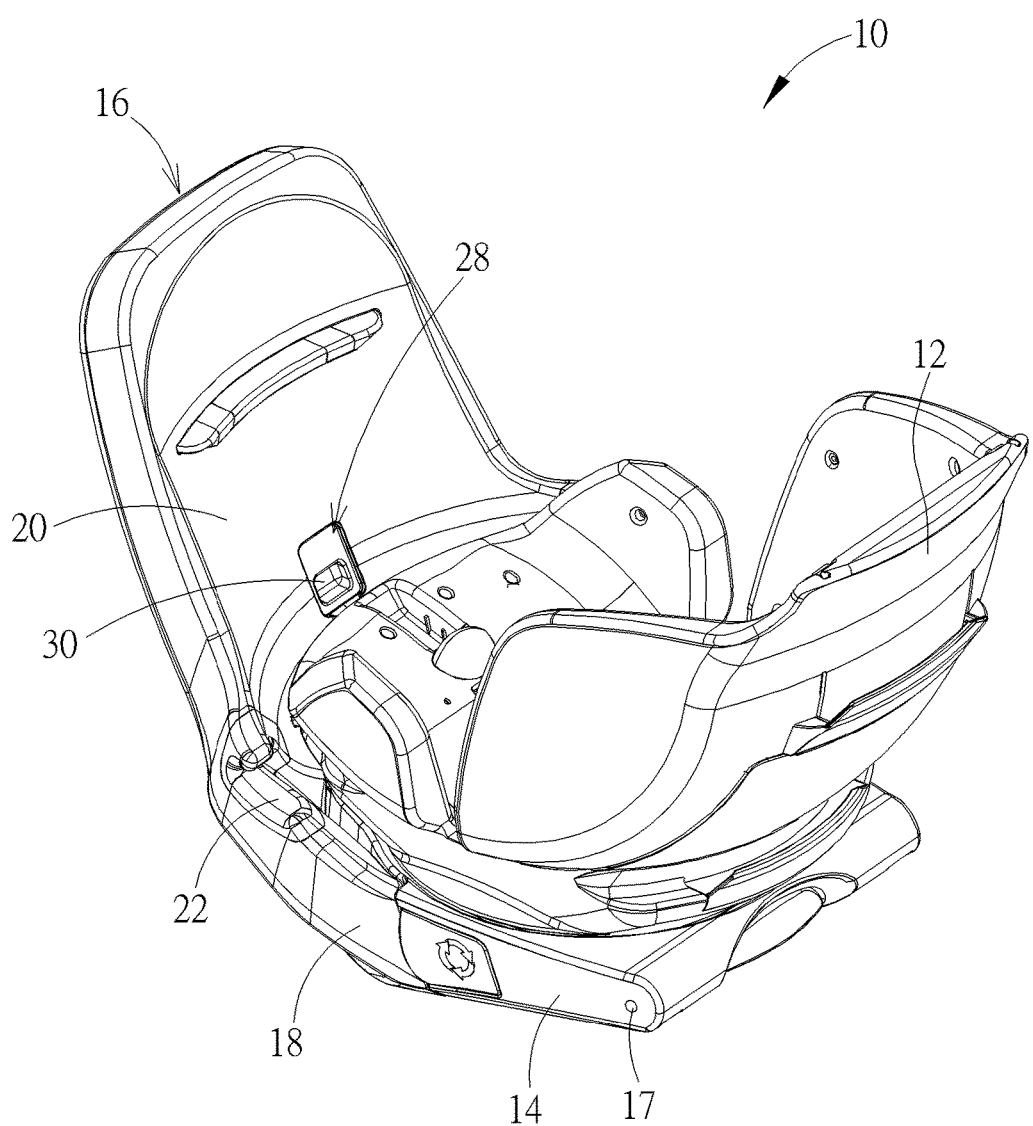
FIG. 3 is a schematic diagram of the seat body in FIG. 1 rotating to a rearward facing position.
Figure 4:
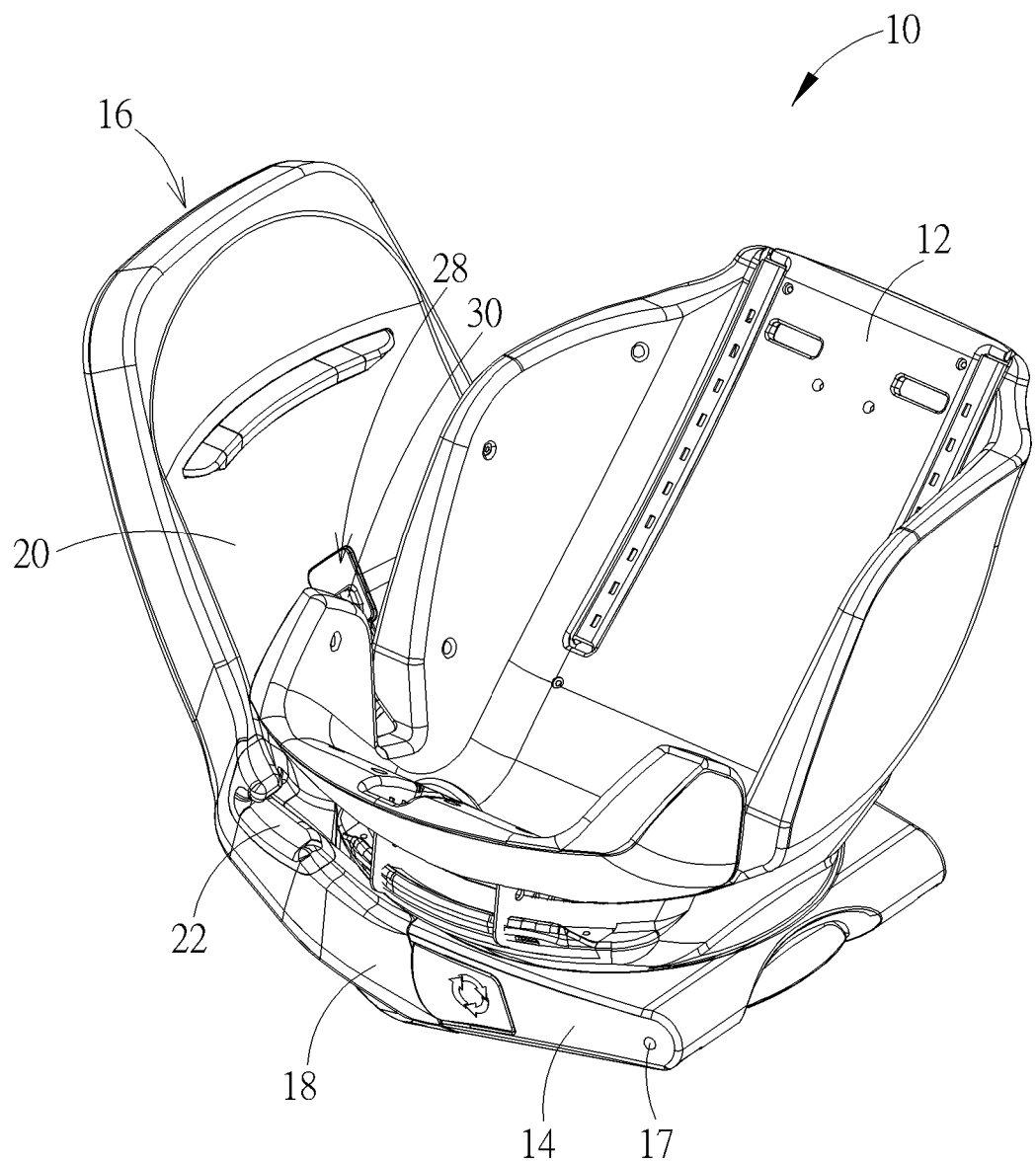
FIG. 4 is a schematic diagram of the seat body in FIG. 1 rotating to a side facing loading position.

Please refer to FIG. 1, FIG. 2, FIG. 3, and FIG. 4. FIG. 1 is a schematic diagram of a child safety seat 10 when a seat body 12 rotates to a forward facing position according to an embodiment of the present invention. FIG. 2 is an exploded diagram of the child safety seat 10 in FIG. 1 with a safety belt 11 attached thereon. FIG. 3 is a schematic diagram of the seat body 12 in FIG. 1 rotating to a rearward facing position. FIG. 4 is a schematic diagram of the seat body 12 in FIG. 1 rotating to a side facing loading position. The child safety seat 10 is for use on a vehicle seat to properly restrain a child in the event of an accident. As shown in FIG. 1, FIG. 2, FIG. 3, and FIG. 4, the child safety seat 10 includes the seat body 12, a seat panel 14, and a seat base 16. In this embodiment, the seat body 12 is preferably rotatable on the seat panel 14 (but not limited thereto), so that the seat body 12 can be rotated to the forward facing position as shown in FIG. 1 for larger children, the rearward facing position as shown in FIG. 3 for small babies or children, or the side facing loading position as shown in FIG. 4 for facing a vehicle door and providing more unobstructed access for a child to get into and out of the seat body 12 conveniently.

Furthermore, as shown in FIG. 2, the seat base 16 has a seat assembly portion 18 and a backrest portion 20. The seat panel 14 is openably movable to the seat assembly portion 18 for movement between an open position and a closed position such that a user can perform an open or close operation of the child safety seat 10. In this embodiment, the seat panel 14 is preferably hinged to an end of the seat assembly portion 18 away from the backrest portion 20 for rotating between an open position to be tilted relative to the seat assembly portion 18 and a closed position to be detachably fixed on the seat base 16. Moreover, as mentioned above, since the seat body 12 is disposed on the seat panel 14, the seat body 12 could rotate together with the seat panel 14 when the seat panel 14 rotates to the open position or the closed position.

To be noted, the child safety seat 10 preferably adopts the design that the seat panel 14 is detachably coupled to the seat base 16. For example, as shown in FIG. 2, the child safety seat 10 could further include at least one pin 17 (two shown in FIG. 2, but not limited thereto), the seat panel 14 could have a first hole 15 corresponding to the pin 17, and the seat assembly portion 18 could have a second hole 19 corresponding to the first hole 15. Accordingly, when the seat panel 14 is assembled with the seat assembly portion 18 to make the first hole 15 aligned with the second hole 19, the pin 17 can be inserted into the first hole 15 and the second hole 19, so as to make the seat panel 14 openably pivoted to the seat assembly portion 18 for rotating together with the seat body 12 between the open position and the closed position. On the other hand, when the user removes the pin 17 from the first hole 15 and the second hole 19, the seat panel 14 is detachable together with the seat body 12 from the seat assembly portion 18. In such a manner, the user can detach the seat panel 14 from the seat assembly portion 18 for using the seat panel 14 having the seat body 12 disposed thereon as a belt position booster (BPB) seat where a child can be secured directly by the safety belt 11 (as shown in FIG. 2, the seat panel 14 has a planar bottom surface 13 for installation on a vehicle seat without the seat base 16 when the seat panel 14 is detached from the seat base 16), so as to increase the functionality and life of the child safety seat 10.

The detachable design of the seat panel 14 and the seat assembly portion 18 is not limited to the aforesaid embodiment, meaning that the child safety seat 10 could adopt other design that the seat panel 14 could be detachably coupled to the seat assembly portion 18. For example, in another embodiment, the seat panel 14 could have a retractable pin, and the seat assembly portion 18 could have a corresponding hole formed thereon. Accordingly, when the retractable pin pops out to be inserted into the hole, the seat panel 14 is openably pivoted to the seat assembly portion 18. On the other hand, when the retractable pin is retracted inwardly to leave the hole, the seat panel 14 is detachable together with the seat body 12 from the seat assembly portion 18. As for more detailed description for this embodiment, it could be reasoned by analogy according to the aforesaid embodiment and omitted herein.

Furthermore, as shown in FIG. 2, the seat base 16 could further have two side wing supports 22. The two side wing supports 22 extend from two sides of the backrest portion 20 respectively for forming a containing space 23 cooperatively with the seat assembly portion 18 and the backrest portion 20, so that the safety belt 11 (briefly depicted by dotted lines) can be laid across a span between the two side wing supports 22 and located above the containing space 23 as shown in FIG. 2 for fixing the child safety seat 10 on a vehicle seat.

Figure 5:
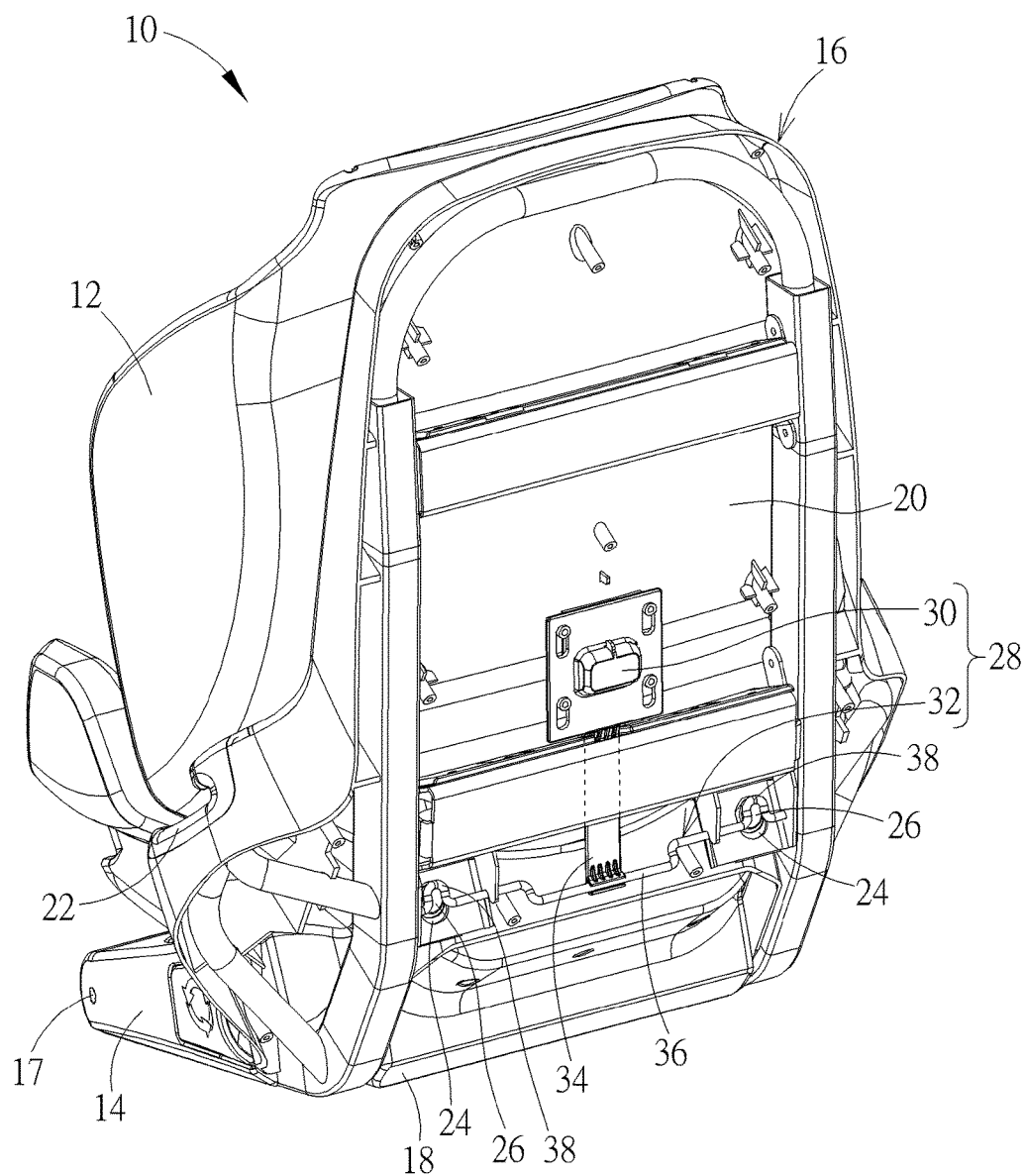
FIG. 5 is a schematic diagram of the child safety seat in FIG. 1 from another viewing angle.
Figure 6:
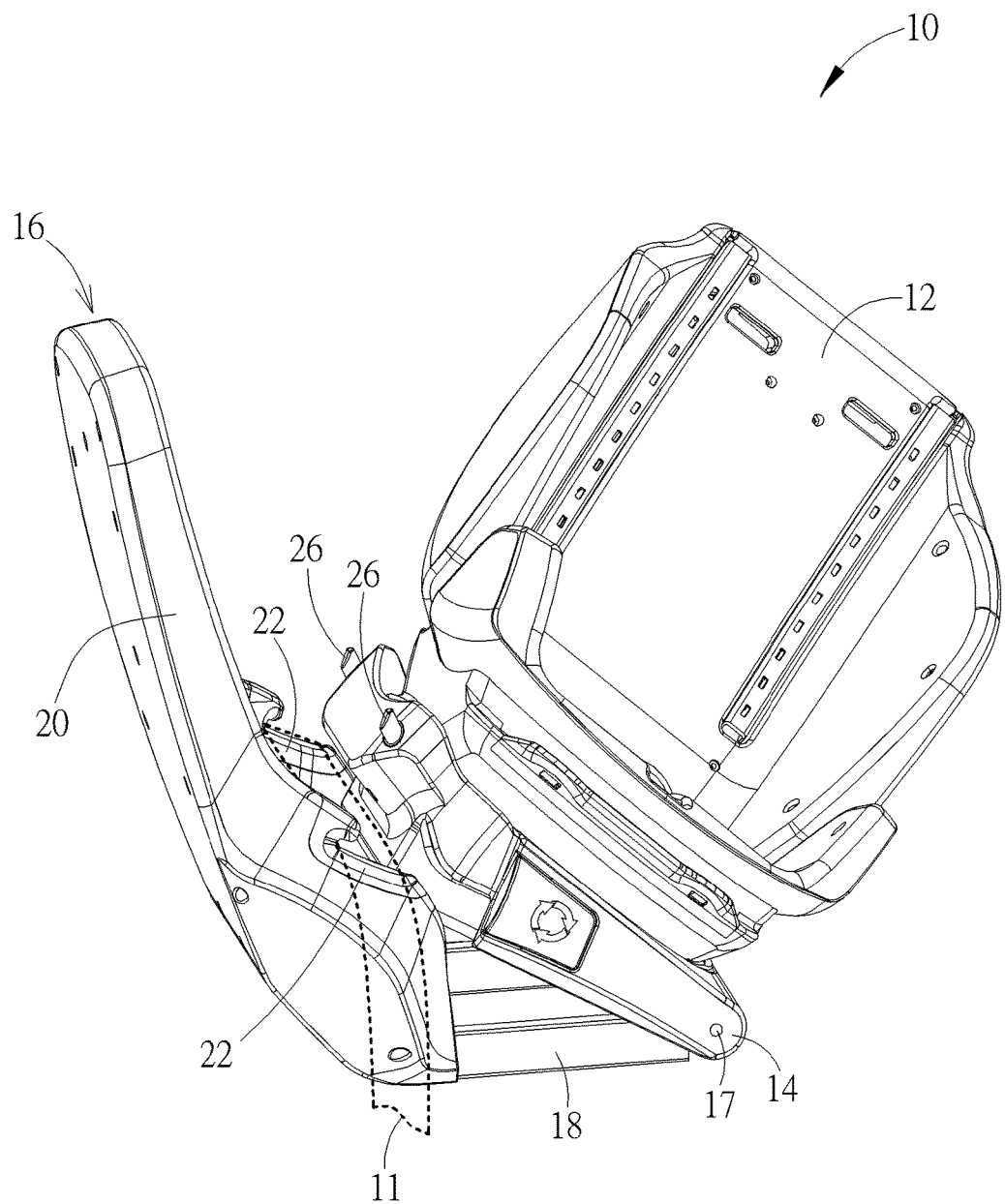
FIG. 6 is a schematic diagram of a seat panel in FIG. 4 rotating to an open position.

As for the design in which the seat panel 14 is detachably fixed on the seat base 16, please refer to FIG. 5 and FIG. 6. FIG. 5 is a schematic diagram of the child safety seat 10 in FIG. 1 from another viewing angle. FIG. 6 is a schematic diagram of the seat panel 14 in FIG. 4 rotating to the open position. As shown in FIG. 5 and FIG. 6, the backrest portion 20 has at least one fixing hole 24 (two shown in FIG. 5, but not limited thereto). The child safety seat 10 further includes a retractable plunger 26 disposed on the seat panel 14 corresponding to the fixing hole 24 and slidable between an engaging position and a retracted position (e.g. by a spring connected to the retractable plunger and the seat panel 14). Accordingly, during rotation of the seat panel 14 from the open position as shown in FIG. 6 back to the closed position as shown in FIG. 5, the backrest portion 20 can bias the retractable plunger 26 to the retracted position. Subsequently, when the seat panel 14 is located at the closed position to make the retractable plunger 26 aligned with the fixing hole 24, the retractable plunger 26 pops out to the engaging position as shown in FIG. 5 to be inserted into the fixing hole 24 for fixing the seat panel 14 to the seat base 16.

Figure 7:
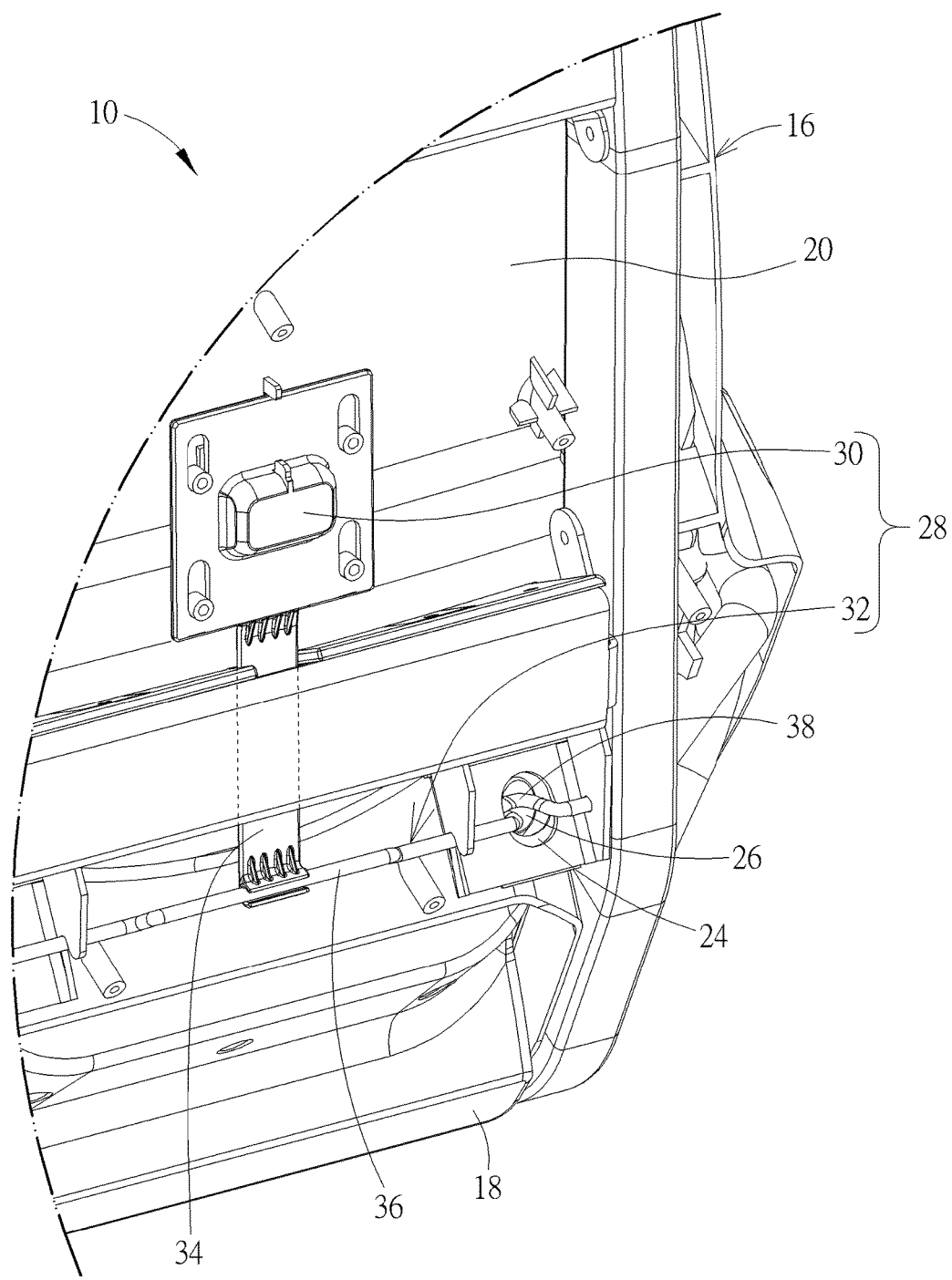
FIG. 7 is a partial enlarged diagram of a retractable plunger in FIG. 5 being ejected out of a fixing hole by a release button mechanism.

In practical application, the child safety seat 10 could further adopt a release button design to allow the user to release the seat panel 14 from the seat base 16 conveniently. For example, please refer to FIG. 5 and FIG. 7. FIG. 7 is a partial enlarged diagram of the retractable plunger 26 in FIG. 5 being ejected out of the fixing hole 24 by a release button mechanism 28. As shown in FIG. 5 and FIG. 7, the child safety seat 10 could further include the release button mechanism 28 disposed on the backrest portion 20 for releasing engagement between the fixing hole 24 and the retractable plunger 26. In this embodiment, the release button mechanism 28 could include a push button 30 and a linkage rod 32. The push button 30 is slidable between a lock position as shown in FIG. 5 and a release position as shown in FIG. 7 on the backrest portion 20 and has a linkage arm 34 extending toward the linkage rod 32. The linkage rod 32 is rotatably disposed on the backrest portion 20, and when the push button 30 is pushed from the lock position as shown in FIG. 5 to the release position as shown in FIG. 7, the linkage arm 34 rotates the linkage rod 32 to eject the retractable plunger 26 out of the fixing hole 24. To be more specific, the linkage rod 32 has a first bending portion 36 pivoted to the linkage arm 34 and a second bending portion 38 corresponding to the fixing hole 24. In such a manner, when the push button 30 is pushed to the release position as shown in FIG. 7, the linkage arm 34 can rotate the linkage rod 32 via the first bending portion 36. With rotation of the linkage rod 32, the second bending portion 38 can rotate to eject the retractable plunger 26 out of the fixing hole 24 as shown in FIG. 7, so as to release engagement between the retractable plunger 26 and the fixing hole 24. Accordingly, since the retractable plunger 26 has been ejected from the fixing hole 24 to release the seat panel 14 from the seat base 16, the user could open the seat panel 14 smoothly.

Figure 8:
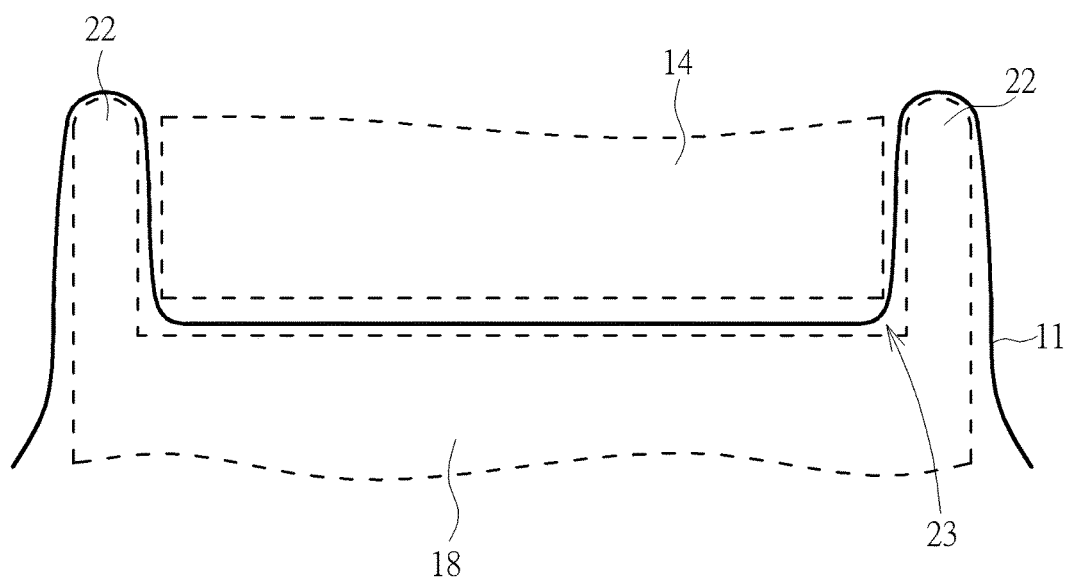
FIG. 8 is a front view briefly illustrating the safety belt in FIG. 2 being clamped by the seat panel in the containing space cooperatively with the two side wing supports and the seat assembly portion.

In the following, more detailed description for installation of the child safety seat 10 is provided. Please refer to FIG. 2, FIG. 4, FIG. 5, FIG. 6, FIG. 7, and FIG. 8. FIG. 8 is a front view briefly illustrating the safety belt 11 in FIG. 2 being clamped by the seat panel 14 in the containing space 23 cooperatively with the two side wing supports 22 and the seat assembly portion 18. To insure connection strength of the seat body 12 and the seat base 16, the seat panel 14 may only be allowed to open when the seat body 12 rotates to the side facing loading position as shown in FIG. 4 (at this time, the release button mechanism 28 is exposed from the backrest portion 20 to allow the user to operate the push button 30). Subsequently, the user just needs to push the push button 30 to the release position as shown in FIG. 7 for releasing engagement between the retractable plunger 26 and the fixing hole 24 as mentioned above. Accordingly, the user could open the seat panel 14 together with the seat body 12 to the open position as shown in FIG. 6 to be tilted relative to the seat assembly portion 18 (at this time, a belt path for the safety belt 11 is accessible as shown in FIG. 6), and could easily lay the safety belt 11 across a span between the two side wing supports 22 to pass over the seat base 16 and be located above the containing space 23. Finally, the user could close the seat panel 14 back to the closed position as shown in FIG. 4 (at this time, the aforesaid belt path for the safety belt 11 is hidden). During the aforesaid process, the seat panel 14 can push the safety belt 11 back behind the outer and forward most position of the safety belt 11 and clamp the safety belt 11 in the containing space 23 cooperatively with the two side wing supports 22 and the seat assembly portion 18, so as to make the safety belt 11 in a concave path as shown in FIG. 8, and the retractable plunger 26 can pop out to the engaging position as shown in FIG. 5 to be inserted into the fixing hole 24 for detachably fixing the seat panel 14 to the seat base 16. In such a manner, the safety belt 11 can be forced from an original path as shown in FIG. 6 to a longer path as shown in FIG. 8 pulling the child safety seat tighter into the vehicle seat for achieving proper tight installation of the child safety seat 10 and moving the safety belt 11 back and out of the space that the seat body 12 wants to take.

In summary, via the aforesaid simple operations, the child safety seat 10 could be installed on the vehicle seat more steadily without detaching the seat body 12 from the seat panel 14 in advance, so as to greatly improve installation convenience of the child safety seat 10. Furthermore, since the safety belt 11 does not pass through the seat body 12, the seat body 12 could rotate freely on the seat panel 14, so as to enhance operational flexibility of the child safety seat 10. Thus, a caregiver can complete installation of the child safety seat 10 quickly and get a child into and out of the child safety seat 10 easily and conveniently, so as to prevent the caregiver from discontinuing using the child safety seat 10 prematurely.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat for use on a vehicle seat, the vehicle seat having a safety belt, the child safety seat comprising:
   a seat base having a seat assembly portion and a backrest portion, the backrest portion having at least one fixing hole;
   a seat panel openably pivoted to the seat assembly portion for rotating between an open position and a closed position;
   a seat body disposed on the seat panel; and
   a retractable plunger disposed on the seat panel corresponding to the at least one fixing hole and slidable between an engaging position and a retracted position;
   wherein when the seat panel rotates to the open position, the safety belt passes over the seat base for attaching the seat base to the vehicle seat;
   when the seat panel rotates to the closed position, the seat panel clamps the safety belt cooperatively with the seat base;
   when the seat panel is located at the closed position to make the retractable plunger aligned with the at least one fixing hole, the retractable plunger pops out to the engaging position to be inserted into the at least one fixing hole for fixing the seat panel to the seat base;
   during rotation of the seat panel from the open position back to the closed position, the backrest portion biases the retractable plunger to the retracted position.

2. The child safety seat of claim 1, wherein the seat panel is openably hinged to an end of the seat assembly portion away from the backrest portion for rotating together with the seat body between the open position to be tilted relative to the seat assembly portion and the closed position to be detachably fixed on the seat base.

3. The child safety seat of claim 1, wherein the seat base further has two side wing supports; when the seat panel rotates to the open position, the safety belt is laid across a span between the two side wing supports; when the seat panel rotates to the closed position, the seat panel pushes the safety belt back and clamps the safety belt cooperatively with the two side wing supports and the seat assembly portion.

4. The child safety seat of claim 3, wherein the two side wing supports extend from two sides of the backrest portion respectively for forming a containing space cooperatively with the seat assembly portion and the backrest portion; when the seat panel rotates to the open position, the safety belt is located above the containing space; when the seat panel rotates to the closed position, the seat panel pushes the safety belt back to the containing space and clamps the safety belt in the containing space cooperatively with the two side wing supports and the seat assembly portion, so as to make the safety belt in a concave path.

5. The child safety seat of claim 1, wherein the child safety seat further comprises a release button mechanism disposed on the backrest portion for releasing engagement between the at least one fixing hole and the retractable plunger.

6. The child safety seat of claim 5, wherein the release button mechanism comprises a push button and a linkage rod, the push button is slidable between a lock position and a release position on the backrest portion and has a linkage arm extending toward the linkage rod, the linkage rod is rotatably disposed on the backrest portion, and when the push button is pushed from the lock position to the release position, the linkage arm rotates the linkage rod to eject the retractable plunger out of the at least one fixing hole, so as to release engagement between the retractable plunger and the at least one fixing hole.

7. The child safety seat of claim 6, wherein the linkage rod has a first bending portion pivoted to the linkage arm and a second bending portion corresponding to the at least one fixing hole, and when the push button is pushed from the lock position to the release position, the linkage arm rotates the linkage rod via the first bending portion for driving the second bending portion to eject the retractable plunger out of the at least one fixing hole, so as to release engagement between the retractable plunger and the at least one fixing hole.

8. The child safety seat of claim 6, wherein the seat body is rotatably disposed on the seat panel for rotating to a forward facing position, a rearward facing position or a side facing loading position relative to the backrest portion, and when the seat body rotates to the side facing loading position, the push button is exposed from the backrest portion.

9. The child safety seat of claim 1, wherein the seat panel is detachably fixed on the seat base when the seat panel rotates to the closed position, the child safety seat further comprises a release button mechanism disposed on the backrest portion for releasing the seat panel from the seat base, the seat body is rotatably disposed on the seat panel for rotating to a forward facing position, a rearward facing position or a side facing loading position relative to the backrest portion, and when the seat body rotates to the side facing loading position, the release button mechanism is exposed from the backrest portion.

10. The child safety seat of claim 1, wherein the seat panel is detachably coupled to the seat assembly portion to make the seat panel detachable together with the seat body from the seat base, such that the seat panel can be installed on the vehicle seat without the seat base.

11. The child safety seat of claim 10, wherein the child safety seat further comprises at least one pin, the seat panel has a first hole formed thereon corresponding to the at least one pin, the seat assembly portion has a second hole formed thereon corresponding to the first hole; when the seat panel is assembled with the seat assembly portion to make the first hole aligned with the second hole, the at least one pin is inserted into the first hole and the second hole, so as to make the seat panel openably pivoted to the seat assembly portion; when the at least one pin is removed from the first hole and the second hole, the seat panel is detachable together with the seat body from the seat assembly portion.

12. A child safety seat for use on a vehicle seat, the vehicle seat having a safety belt, the child safety seat comprising:
a seat base having a seat assembly portion and a backrest portion;
at least one pin;
a seat panel openably movable to the seat assembly portion for movement between an open position and a closed position, the seat panel having a first hole formed thereon corresponding to the at least one pin, the seat assembly portion having a second hole formed thereon corresponding to the first hole; and
a seat body disposed on the seat panel;
wherein when the seat panel moves to the open position, a belt path for the safety belt is accessible;
when the seat panel moves to the closed position, the belt path for the safety belt is hidden;
when the seat panel is assembled with the seat assembly portion to make the first hole aligned with the second hole, the at least one pin is inserted into the first hole and the second hole, so as to make the seat panel openably pivoted to the seat assembly portion;
when the at least one pin is removed from the first hole and the second hole, the seat panel is detachable together with the seat body from the seat base, such that the seat panel can be installed on the vehicle seat without the seat base.

13. A child safety seat for use on a vehicle seat, the vehicle seat having a safety belt, the child safety seat comprising:
a seat base having a seat assembly portion and a backrest portion;
at least one pin;
a seat panel detachably coupled to the seat assembly portion, the seat panel having a first hole formed thereon corresponding to the at least one pin, and the seat panel further having a planar bottom surface for installation on the vehicle seat when the seat panel is detached from the seat base, the seat assembly portion having a second hole formed thereon corresponding to the first hole; and
a seat body disposed on the seat panel to make the seat panel detachable together with the seat body from the seat base;
wherein the seat body is installed on the vehicle seat together with the seat panel via the safety belt when the seat panel is detached from the seat base;
when the seat panel is assembled with the seat assembly portion to make the first hole aligned with the second hole, the at least one pin is inserted into the first hole and the second hole, so as to make the seat panel detachably coupled to the seat assembly portion;
when the at least one pin is removed from the first hole and the second hole, the seat panel is detachable together with the seat body from the seat base.

14. A child safety seat for use on a vehicle seat, the vehicle seat having a safety belt, the child safety seat comprising:
a seat base having a seat assembly portion and a backrest portion;
a seat panel openably pivoted to the seat assembly portion for rotating between an open position and a closed position, and the seat panel being detachably fixed on the seat base when the seat panel rotates to the closed position;
a seat body rotatably disposed on the seat panel for rotating to a forward facing position, a rearward facing position or a side facing loading position relative to the backrest portion; and
a release button mechanism disposed on the backrest portion for releasing the seat panel from the seat base;
wherein when the seat panel rotates to the open position, the safety belt passes over the seat base for attaching the seat base to the vehicle seat;
when the seat panel rotates to the closed position, the seat panel clamps the safety belt cooperatively with the seat base;
when the seat body rotates to the side facing loading position, the release button mechanism is exposed from the backrest portion.

15. A child safety seat for use on a vehicle seat, the vehicle seat having a safety belt, the child safety seat comprising:
a seat base having a seat assembly portion and a backrest portion;
at least one pin;
a seat panel openably pivoted to the seat assembly portion for rotating between an open position and a closed position, the seat panel having a first hole formed thereon corresponding to the at least one pin, the seat assembly portion having a second hole formed thereon corresponding to the first hole; and
a seat body disposed on the seat panel;
wherein when the seat panel rotates to the open position, the safety belt passes over the seat base for attaching the seat base to the vehicle seat;
when the seat panel rotates to the closed position, the seat panel clamps the safety belt cooperatively with the seat base;
when the seat panel is assembled with the seat assembly portion to make the first hole aligned with the second hole, the at least one pin is inserted into the first hole and the second hole, so as to make the seat panel openably pivoted to the seat assembly portion;
when the at least one pin is removed from the first hole and the second hole, the seat panel is detachable together with the seat body from the seat assembly portion, such that the seat panel can be installed on the vehicle seat without the seat base.

* * * * *